United States Patent [19]

Albaugh et al.

[11] Patent Number: 5,463,739
[45] Date of Patent: Oct. 31, 1995

[54] APPARATUS FOR VETOING REALLOCATION REQUESTS DURING A DATA TRANSFER BASED ON DATA BUS LATENCY AND THE NUMBER OF RECEIVED REALLOCATION REQUESTS BELOW A THRESHOLD

[75] Inventors: Virgil A. Albaugh, Round Rock; John S. Muhich, Austin; Edward J. Silha, Austin; Michael T. Vanover, Austin, all of Tex.

[73] Assignee: International Business Machines Corporation, Armonk, N.Y.

[21] Appl. No.: 994,864

[22] Filed: Dec. 22, 1992

[51] Int. Cl.$^6$ .................. G06F 12/02; G06F 13/14
[52] U.S. Cl. ............... 395/826; 395/775; 395/849; 395/878; 395/494; 395/497.01; 395/296; 364/228.1; 364/230.2; 364/242.91; 364/256.3; 364/DIG. 1
[58] Field of Search .................... 395/325, 425, 395/275, 650, 775, 725

[56] References Cited

U.S. PATENT DOCUMENTS

| | | | |
|---|---|---|---|
| 3,333,252 | 7/1967 | Shimabukuro | 340/172.5 |
| 4,277,826 | 7/1981 | Collins et al. | 364/200 |
| 4,388,621 | 6/1983 | Komatsu et al. | 340/802 |
| 4,495,571 | 1/1985 | Staplin, Jr. et al. | 395/325 |
| 4,574,350 | 3/1986 | Starr | 364/200 |
| 4,787,026 | 11/1988 | Barnes et al. | 364/200 |
| 4,792,895 | 12/1988 | Tallman | 364/200 |
| 4,811,206 | 3/1989 | Johnson | 364/200 |
| 4,831,541 | 5/1989 | Eshel | 364/200 |
| 4,847,757 | 6/1989 | Smith | 364/200 |
| 4,849,875 | 7/1989 | Fairman et al. | 364/200 |

(List continued on next page.)

FOREIGN PATENT DOCUMENTS 1-99163  4/1989  Japan.

OTHER PUBLICATIONS

IBM TDB, "Channel DAT and Page Pinning for Block Unit Transfers", vol. 23, No. 2, Jul. 1980, pp. 704–705.
IBM TDB, "Distinguishing Between Short Term and Long Term Pins of Pages in Virtual Memory During I/O", vol. 29, No. 6, Nov. 1986, pp. 2689–2690.
IBM TDB, "System Memory Configuration and Management in a Virtual Terminal Environment", vol. 31, No. 1, Jun. 1988, p. 411.
IBM TDB, "Linear–To–Physical Memory Mapping by Bus Masters in Virtual Memory Systems", vol. 34, No. 4A, Sep. 1991, pp. 355–357.

(List continued on next page.)

*Primary Examiner*—Thomas C. Lee
*Assistant Examiner*—Marc K. Weinstein
*Attorney, Agent, or Firm*—Mark E. McBurney; Andrew J. Dillon

[57] ABSTRACT

A method for managing a data transfer between a first device and an allocated portion of common memory including the steps of receiving a reallocation request of the allocated portion of common memory from a second device, receiving a veto of the requested reallocation from the first device, and delaying the reallocation request. In addition, a method for transferring data between a peripheral device and a common memory in a virtual memory system including the steps of instructing the peripheral device to transfer data with an allocated portion of the common memory, requesting a reallocation of the allocated portion of the common memory, and receiving a veto of the requested reallocation from the peripheral device in response to the instructed data transfer. Furthermore, an apparatus for transferring data between a peripheral device and a common memory in a virtual memory system including an apparatus for instructing the peripheral device to transfer data with an allocated portion of the common memory, an apparatus for requesting a reallocation of the allocated portion of the common memory, and an apparatus for receiving a veto of the requested reallocation from the peripheral device in response to the instructed data transfer.

15 Claims, 7 Drawing Sheets

U.S. PATENT DOCUMENTS

| | | | |
|---|---|---|---|
| 4,912,632 | 3/1990 | Gach et al. | 364/200 |
| 4,914,619 | 4/1990 | Harris et al. | 364/900 |
| 4,916,301 | 4/1990 | Mansfield et al. | 340/747 |
| 4,928,253 | 5/1990 | Yamauchi et al. | 364/521 |
| 5,016,167 | 5/1991 | Nguyen et al. | 364/200 |
| 5,047,921 | 9/1991 | Kinter et al. | 395/650 |
| 5,067,071 | 11/1991 | Schanin et al. | 395/275 |
| 5,265,212 | 11/1993 | Bruce, II | 395/325 |
| 5,313,603 | 5/1994 | Takishima | 395/425 |

OTHER PUBLICATIONS

IBM TDB, "Software Recovery of Page Faults on Microprocessors with Integrated Memory Management Units", vol. 34, No. 10B, Mar. 1992, pp. 426–429.

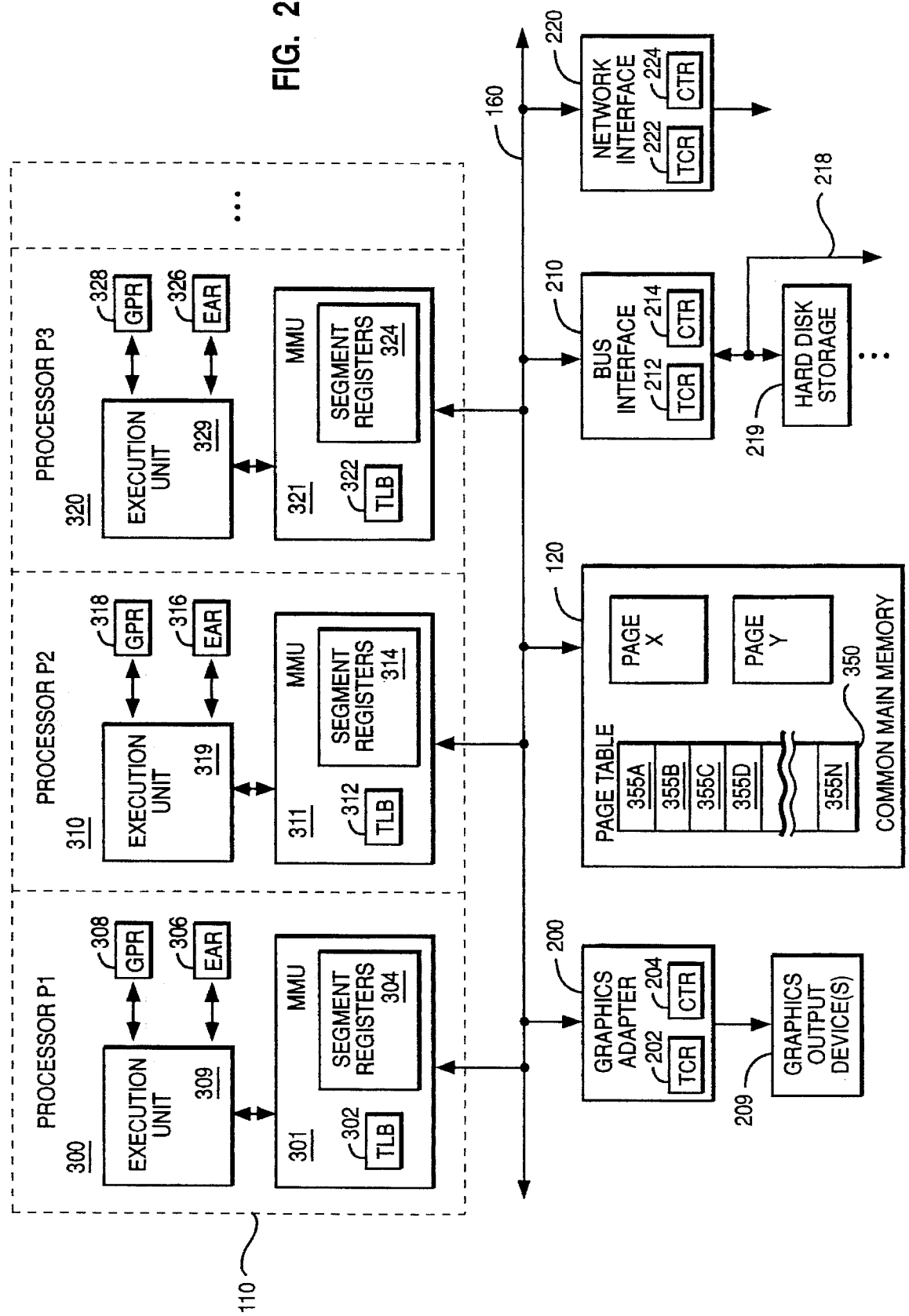

| 31 | RT | RA | RB | 310 | R |
|---|---|---|---|---|---|
| 0 | 6 | 11 | 16 | | 31 |

FIG. 6A

| 31 | RS | RA | RB | 438 | R |
|---|---|---|---|---|---|
| 0 | 6 | 11 | 16 | | 31 |

FIG. 6B

| EAR | E | | RID |
|---|---|---|---|
| | 0 | 1    6 | 26   31 |

FIG. 7A

| TCR | CMP | COMMAND | E | A | C | P | LENGTH |
|---|---|---|---|---|---|---|---|
| | 0    7 | 8  9   10   11 | 12 | | | 15 | 16              31 |

FIG. 7B

APPARATUS FOR VETOING REALLOCATION REQUESTS DURING A DATA TRANSFER BASED ON DATA BUS LATENCY AND THE NUMBER OF RECEIVED REALLOCATION REQUESTS BELOW A THRESHOLD

TECHNICAL FIELD

The present invention relates generally to virtual memory and more specifically to data transfers in a virtual memory system.

BACKGROUND ART

In a virtual memory system one or more processors may share a common memory in combination with one or more controllers or devices. A processor may request a controller to directly access the common memory without the continuous intervention of the processor by sending the controller a command to transfer the data and sending the controller the address of the storage location of the data. This remote access of the common memory by the device is called direct memory access (DMA). In the prior art it is common for the processor to request the virtual memory manager to pin or prevent alteration of the memory being accessed by the device to prevent any reallocation of that data by the processor or other processors prior to the completion of the DMA process by the device. This is accomplished by providing a description of the memory being accessed in the common memory in a process called pinning. If the data is pinned, then the data will not be reallocated by the virtual memory manager until the data is unpinned by another call to the virtual memory manager. However, such calls to the virtual memory manager are very time consuming because they require multiple context switches and the execution of hundreds of instructions and may slow down the processing of data throughout the data processing system. In addition, the pinning of memory does not allow for any sort of prioritization between the DMA being performed by the device and the need of the virtual memory manager to reallocate data in the common memory.

DISCLOSURE OF THE INVENTION

The present invention includes a method for managing a data transfer between a first device and an allocated portion of common memory including the steps of receiving a reallocation request of the allocated portion of common memory from a second device, receiving a veto of the requested reallocation from the first device, and delaying the reallocation request. In addition, the present invention includes a method for transferring data between a peripheral device and a common memory in a virtual memory system including the steps of instructing the peripheral device to transfer data with an allocated portion of the common memory, requesting a real location of the allocated portion of the common memory, and receiving a veto of the requested reallocation from the peripheral device in response to the instructed data transfer. Furthermore, the present invention includes an apparatus for transferring data between a peripheral device and a common memory in a virtual memory system including an apparatus for instructing the peripheral device to transfer data with an allocated portion of the common memory, an apparatus for requesting a reallocation of the allocated portion of the common memory, and an apparatus for receiving a veto of the requested reallocation from the peripheral device in response to the instructed data transfer.

A further understanding of the nature and advantages of the present invention may be realized by reference to the remaining portions of the specification and the drawings.

BRIEF DESCRIPTION OF THE DRAWING

FIG. 2 is a more detailed block diagram of portions of the digital computer described above with reference to FIG. 1;

FIG. 6A illustrates a transfer out or store command for use in a processor to initiate a transfer of data from common main memory to a peripheral device on the system bus;

FIG. 6B illustrates a transfer in or load command for use in a processor to initiate a transfer of data from a peripheral device on the system bus to the processor;

FIGS. 7A–7B illustrate the external access register (EAR) and the transfer control/status register (TCR) utilized by the preferred embodiment of the invention when performing a virtual data transfer.

BEST MODE FOR CARRYING OUT THE INVENTION

Figure 1:
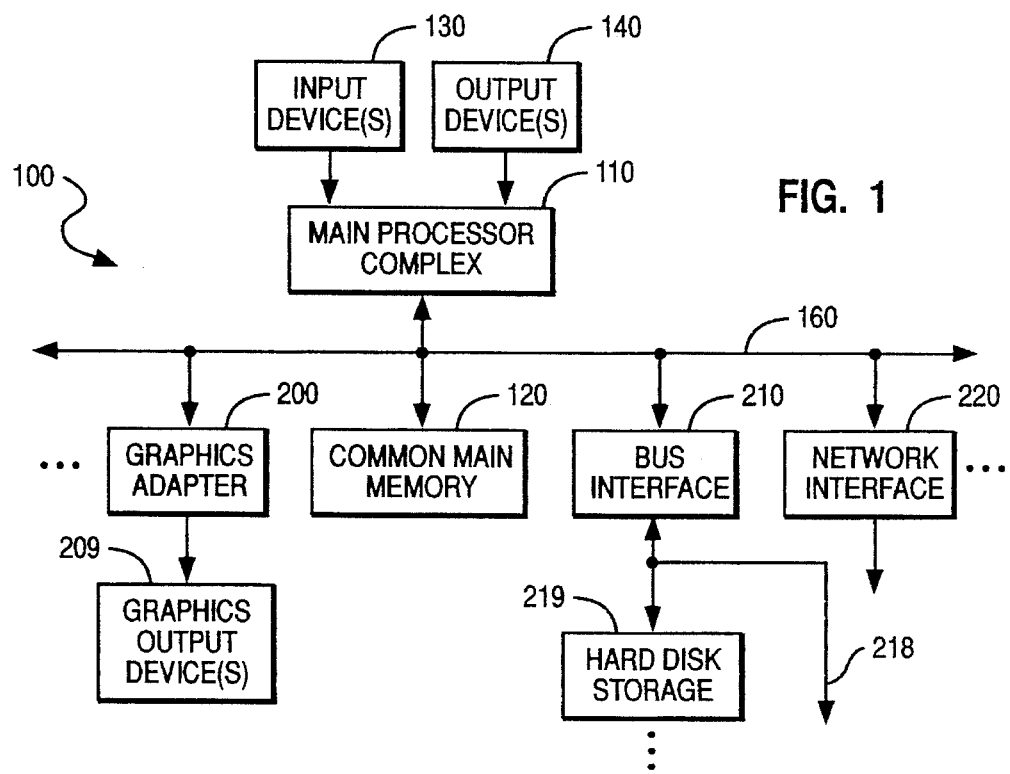
FIG. 1 is a block diagram of a typical digital computer utilized by a preferred embodiment of the invention.

FIG. 1 is a block diagram of a typical digital computer 100 utilized by a preferred embodiment of the invention. The computer includes a main processor complex 110 coupled to a main memory 120, input device(s) 130 and output device(s) 140. Main processor complex 110 may include a single processor or multiple processors coupled together. Input device(s) 130 may include a keyboard, mouse, tablet or other types of input devices. Output device(s) 140 may include a text monitor, plotter or other types of output devices. The main processor complex 110 may also be coupled to several controllers. adapters or other peripheral devices such as graphics adapter 200, bus interface 210, network interface 220 and other devices on a system bus or busses 160. The controllers are devices or adapters typically located on the system bus that can operate independently from the processors (such as for a data transfer). The main processor complex may also be coupled to other peripheral devices through controllers located on the system bus. For example, the main processor complex may be coupled to a hard disk 219 or other peripheral devices across system bus 160, bus interface 210 and bus 218. The main processor complex may also be coupled to graphics output device(s) 209 such as a graphics display through a graphics adapter 200. Graphics adapter 200 receives instructions regarding graphics from main processor 110 on system bus 160. The graphics adapter then executes those instructions and displays its output on graphics output device 205.

FIG. 2 is a more detailed block diagram of portions of the digital computer described above with reference to FIG. 1, illustrating a multiprocessor data processing system 100 that utilizes a common main memory according to a preferred embodiment of the invention. The data processing system 100 includes processors 300, 310 and 320 in main processor complex 110. In the preferred embodiment, the main processor complex includes at least one processor sharing a common operating system. Additional processors may be included in this framework. The processors are coupled to common main memory 120, graphics adapter 200, network interface 220 and bus interface 210 across system bus 160. Each of time processors includes a dedicated memory management unit (MMU) 301, 311, and 321 for handling various memory management functions. In the preferred embodiment, each MMU includes a translation lookaside buffer (TLB) 302, 312 and 322 and a dedicated set of segment registers 304, 314 and 324 for handling virtual memory translations. Alternative embodiments may include other mechanisms for performing virtual memory translations or other memory management functions. The segment registers include system entries in the preferred embodiment for translation of an effective address to a virtual address. In the preferred embodiment, there are 16 segment registers that are referenced by four bits of an effective address. The translation lookaside buffers provide a cache of recently used page table entries for efficient translation of virtual addresses to real addresses. In the preferred embodiment, there are about 128 to 256 TLB entries for each processor. Each of the processors also includes a dedicated external access register (EAR) 306, 316 and 326, a dedicated set of general purpose registers (GPR) 308, 318 and 328 for handling virtual memory transfers, and at least one execution unit 309, 319, and 329 for executing instructions. The GPRs may also be used for other functions by the processors. The use of all these registers will be described in greater detail below.

The common main memory 120 includes a page table 350 with entries 355A through 355N for translating virtual addresses to real addresses. These entries are eight bytes or two words wide in the preferred embodiment of the invention. The TLBs in the MMUs described above are caches of the page table. Examples of pages stored in common main memory are Page X and Page Y. The page table entries map virtual page addresses to real page addresses for pages that are being used by the processors and/or the controllers. The entries for real pages that are not being used are marked invalid so that no program using a virtual address can access the page.

Some of the controllers located on the system bus includes a transfer control/status register (TCR) 202, 212, and 222 and optionally a counter (CTR) 204, 214, and 224 for handling virtual memory transfers. The use of these registers will be described in greater detail below.

Figure 3:
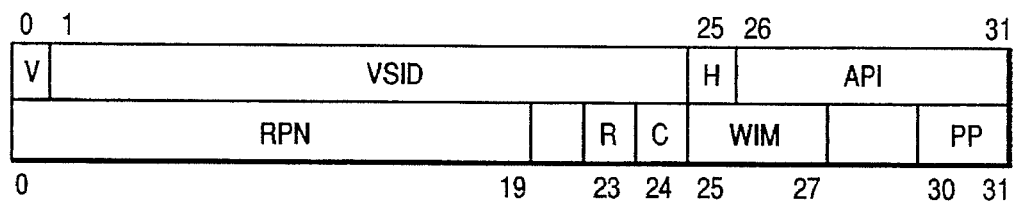
FIG. 3 illustrates a page table entry according to the preferred embodiment of the invention.

FIG. 3 illustrates a page table entry according to the preferred embodiment of the invention. Each page table entry maps one virtual address page number to one real address page number. In column 0 of the first word is a validity bit for indicating whether the entry is valid. An entry may be invalidated by changing this bit from a 1 (entry valid) to a 0 (entry invalid). In columns 1–24 of the first word is the virtual segment identifier which is the 24-bit identifier found in the segment register and used to generate the virtual address from the effective address. In column 25 of the first word is a hash function identifier. In columns 26–31 of the first word is an abbreviated page index. The hash function identifier and the abbreviated page index are used in a hashing function to select the page table entry group. In columns 0–19 of the second word are the real address page number to be used to generate a real address. Columns 20–22 and 28–29 of the second word are reserved for future use or other features. In column 23 of the second word is a reference bit used to indicate that a processor or device is referencing this page. In column 24 of the second word is a change bit used to indicate that some processor or device has changed some information in the page. In columns 25–27 of the second word are cache controls used to indicate whether the page is write_through, cache-inhibited, globally_accessible or other desirable cache control schemes. In columns 30–31 are page protection and data coherency bits used to indicate if the page is readable, writable, changed, or referenced by a program being executed by a processor. In alternative embodiments, other page protection or data coherency schemes may be utilized.

Figure 4:
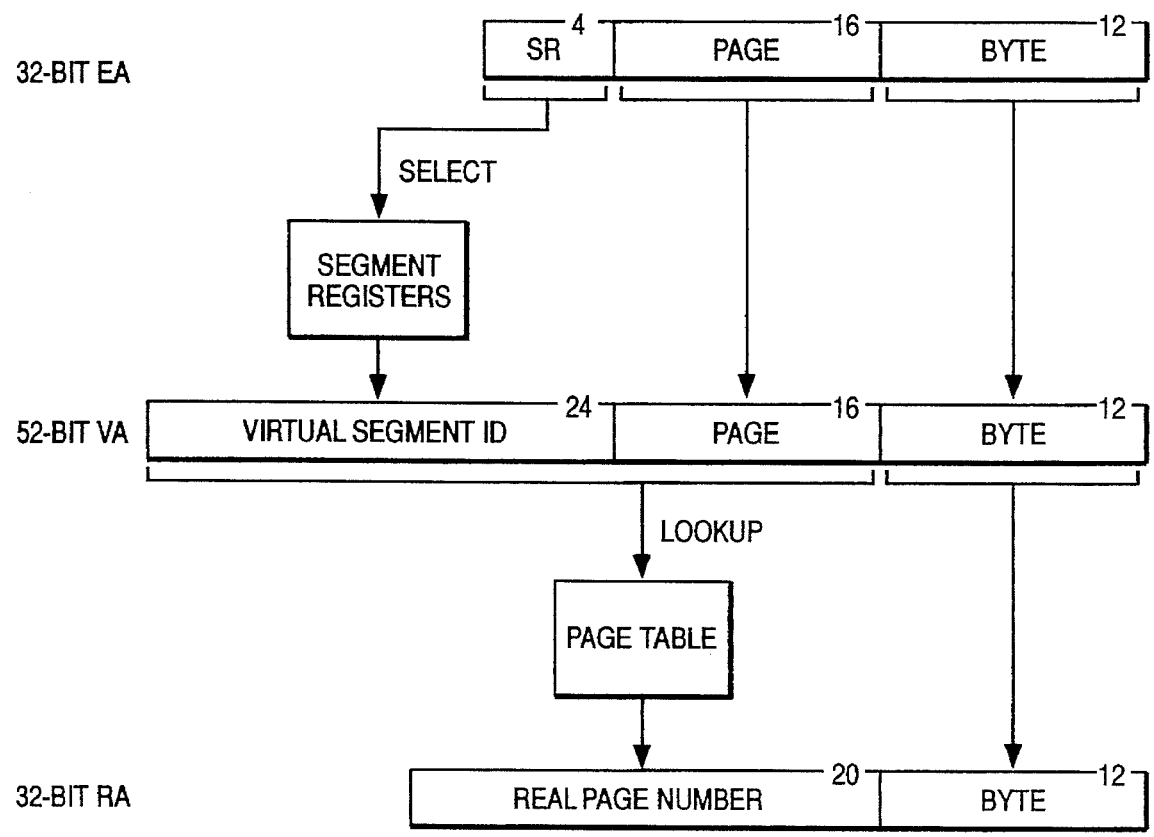
FIG. 4 illustrates, in the preferred embodiment of the invention, how a 32-bit effective address is translated to a 52-bit virtual address and then to a 32-bit real address.

FIG. 4 illustrates, in a preferred embodiment of the invention, how a 32-bit effective address is translated to a 52-bit virtual address and then to a 32-bit real address. The translation from an effective address to a real address is preferably performed by the MMU. The effective address of data is normally utilized by software within a processor. The real address of data is normally utilized in communications between processors and devices. The real address of data is also utilized to access data from real memory, whether in common main memory or storage devices. The effective address includes a high order 4-bit reference to the segment registers, a 16-bit page reference and a 12-bit byte reference. The 4-bit segment register reference is used to address the 16 entry segment register to obtain a 24-bit virtual segment ID from the addressed segment register. The 24-bit virtual segment ID from the segment register is then concatenated with the 16-bit page reference and the 12-bit byte reference to obtain a 52-bit virtual address. The 52-bit virtual address can then be translated to a 32-bit real address by concatenating the 24-bit virtual segment ID and the 16-bit page reference to generate a 40-bit page table lookup value. This page table lookup value is then used to obtain a real page number from either the translation lookaside buffer (TLB) or the page table in common main memory. The result of this is a 20-bit real page number which is then concatenated with the 12-bit byte reference to generate the desired 32-bit real address.

Figure 5:
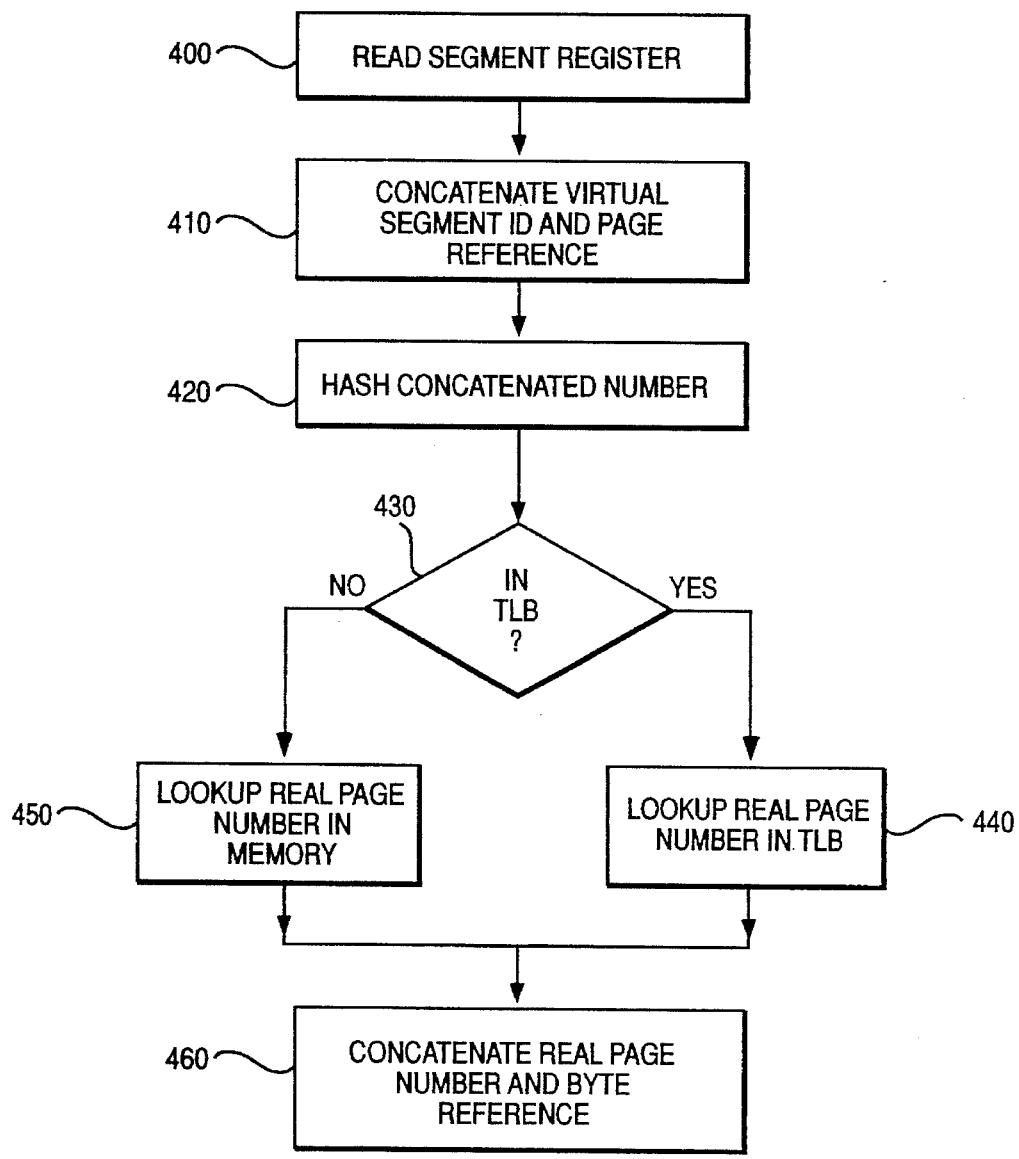
FIG. 5 is a flowchart illustrating how an effective address is translated to a real address according to the preferred embodiment of the invention.

FIG. 5 is a flowchart illustrating how an effective address is translated to a real address according to the preferred embodiment of the invention. In a first step 400, a processor such as processor 300 of FIG. 2 uses the high order four bits of the 32-bit effective address to read the dedicated 16 entry segment register 304 to obtain a 24-bit virtual segment ID. In step 410, the processor concatenates the 24-bit virtual segment ID with the 16-bit page reference to obtain a 40-bit page table reference. In step 420, the resulting 40-bit page table reference is then hashed to obtain a 32-bit real address of a page table entry. In step 430, the processor determines whether or not the page table entry is located within the translation lookaside buffer (TLB) 302 dedicated to the processor. If yes, then in step 440 the processor looks up the entry in the TLB 302 dedicated to that processor to obtain a 20-bit real page number and in step 460, the real page number is concatenated with the 12-bit byte reference to obtain the 32-bit real address. If, in step 430, the page table reference was not in the dedicated translation lookaside buffer, then in step 450 the processor reads the page table in common main memory to obtain the desired real page number and processing continues to step 460.

To transfer data between processors and devices on the system bus, a transfer data instruction is utilized in a processor to initiate the data transfer in a preferred embodiment of the invention. FIG. 6A illustrates a transfer in (LOAD) command for use in a processor to initiate a transfer of data from common main memory to a device on the system bus. FIG. 6B illustrates a transfer out (STORE) command for use in a processor to initiate a transfer of data from a device on the system bus to the common memory.

With reference to FIG. 6A, a transfer in (LOAD) command includes a primary op (operation) code in columns 0–5 and an extended op code in columns 21–30. This is the op code mechanism used by the preferred embodiment of the invention, although other op codes may be utilized in alternative embodiments. In columns 11–15 and 16–20 of the instruction are references to registers RA and RB in the general purpose registers of the processor. The contents of registers RA and RB are used to compute the effective address of a location in memory from which the controller will transfer a specified amount of data. According to the preferred embodiment of the invention, the effective address of the memory location is equal to the value located in register RA plus the value located in register RB unless RA equals zero. If RA equals zero (i.e., not equal to 1–31) then the effective address of the memory location is equal to the value located in register RB. Of course, alternative embodiments may utilize other schemes for generating an effective address. Once the effective address is determined, then the corresponding real address may be determined by the processor using the procedure described above. The processor sends the real address, computed as previously described, to the controller on the system bus and, in turn, receives a 32-bit operand from the controller. This operand is placed in the GPR specified by the target (RT) field in columns 6–10 of the instruction. Bit location 31 is reserved for future use.

With reference to FIG. 6B, a transfer out (STORE) command includes a primary op code in columns 0–5 and an extended op code in columns 21–30. This is the op code mechanism used by the preferred embodiment of the invention, although other op codes may be utilized in alternative embodiments. In columns 11–15 and 16–20 of the instruction are references to registers RA and RB in the general purpose registers of the processor. The contents of registers RA and RB are used to compute the effective address of a location in memory to which the controller will transfer a specified amount of data. According to the preferred embodiment of the invention, the effective address of the memory location is equal to the value located in register RA plus the value located in register RB unless RA equals zero. If RA equals zero (i.e., not equal to 1–31) then the effective address of the memory location is equal to the value located in register RB. Once the effective address is determined, then the corresponding real address may be determined by the processor using the procedure described above. The processor sends the real address, computed as previously described, to the controller along with the content of the source (RS) register specified by the RS field in columns 6–10 of the instruction. Bit location 31 is reserved for future use.

FIGS. 7A–7B illustrate the external access register (EAR) and the transfer control/status register (TCR) utilized by the preferred embodiment of the invention when performing a virtual data transfer. The EAR is associated with a particular processor and the TCR is associated with a particular controller.

With reference to FIG. 7A, each processor implements an EAR which is set by software to indicate which controller is to accept the transfer commands executed by that particular processor. In column 26–31 is stored a resource identifier (RID) for identifying which device on the system bus is to accept the command for the data transfer. Each controller has a unique RID and accepts commands when that RID is presented on the system bus. It is possible to implement a controller that supports multiple processors concurrently by having the device recognize multiple RIDs. Each processor using the controller would then communicate with the controller using a unique RID creating the effect that the controller has multiple channels with each used by a different processor. Each RID recognized by a controller should have a separate TCR associated with each RID. However, it is common that a given processor may not need access to a particular device and the number of RIDs may be less. In addition, a given processor may utilize over time multiple RIDs for a given device for a variety of uses. In column 1 is an enable bit which indicates whether the currently executing process is allowed to execute a data transfer instruction. This enablement mechanism is useful to serialize access to the devices by the processes being executed.

With reference to FIG. 7B, the TCR contains control and status information of the device involved with a data transfer. The contents of the TCR are transferred to the GPR in the processor specified by RT when the processor executes a transfer in (LOAD) command. Columns 0–7 include bits 12–19 of the effective address of the data being transferred. This data is to be used to prevent processors from altering that data in the common main memory as will be explained in greater detail herein with reference to FIGS. 8A–8D. Columns 8–11 include a command to indicate what action is to be taken on the data (e.g. compress, draw an object on a graphics display, etc.). Column 12 includes an exception bit which indicates whether an exception to a previous transfer has occurred. Examples of such exceptions include a TLB sync, a process switch, or a page crossing, which will be described in greater detail below. A value of 0 indicates no exception whereas a value of 1 indicates an exception. Column 13 includes a command word accepted or rejected bit indicating whether the current transfer data command has been accepted or rejected by the device. A value of 0 indicates the command has been accepted whereas a value of 1 indicates a command has been rejected. Column 14 includes a command completed bit indicating whether or not a previously initiated transfer was completed. A value of 0 indicates a command was not completed and a value of 1 indicates the command was completed. Column 15 includes a memory pinned bit to indicate whether memory has been pinned for use this data transfer. Although the present invention is directed to the capability of transferring data without pinning memory, it may be preferably to pin memory for some data transfers such as high data volume real-time applications (e.g. multimedia) or very large data transfers. Columns 16–31 provide the length of the data to be transferred or remaining to be transferred by the data transfer command.

Figure 8A:
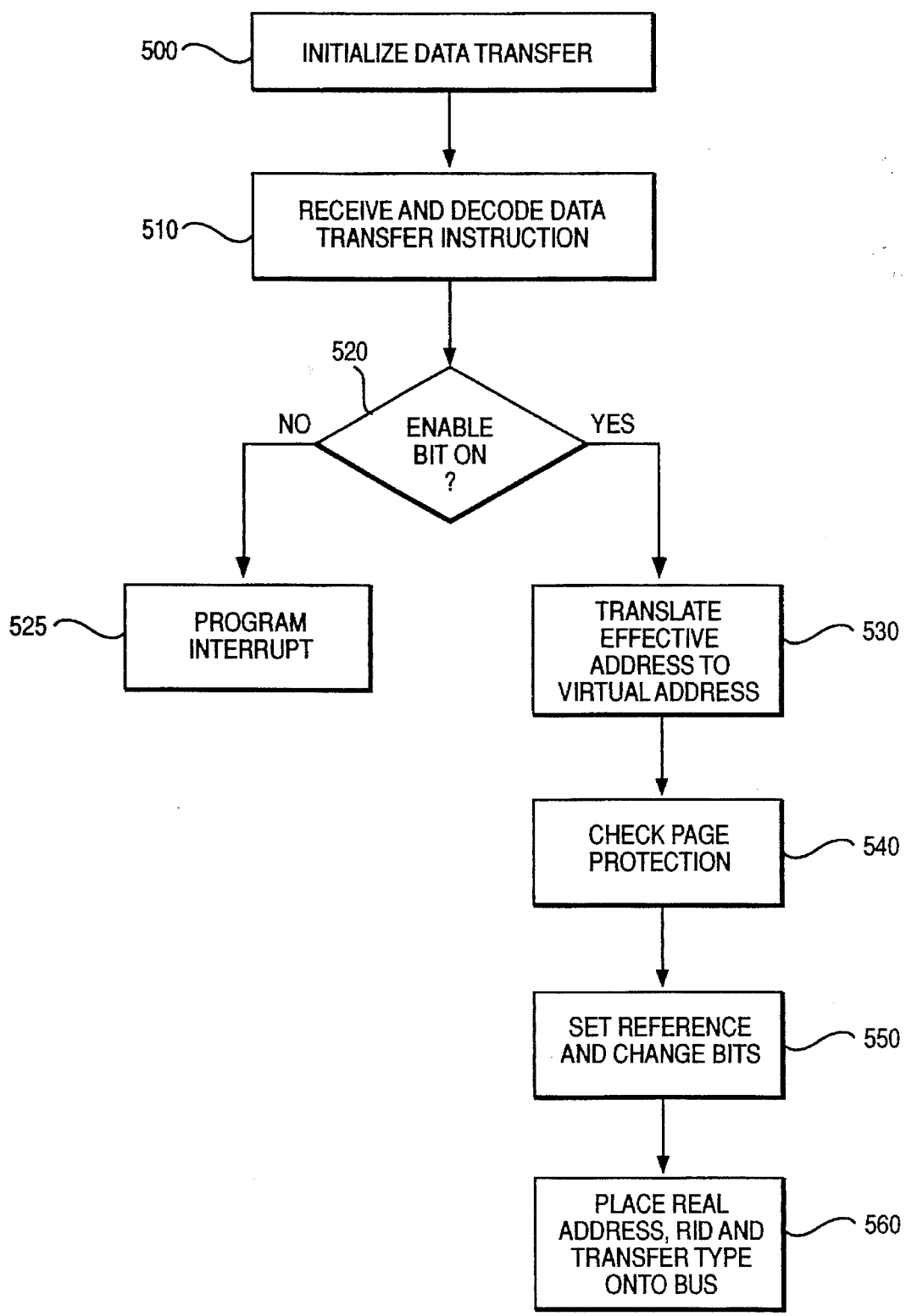
FIG. 8A–8D are flowcharts describing a data transfer using the preferred embodiment of the invention.

FIG. 8A is a flowchart describing a data transfer using the preferred embodiment of the invention. In step 500, a program executing on a processor initializes the data transfer. This process will load directly or construct a transfer load command for the desired device in a general purpose register. This command includes the operation to be performed on the data to be transferred and the length of this data. This process will then load the base and offset of the effective address of the data to be transferred into the general purpose registers. During or prior to initialization, the process will make a call to the operating system to get the resource identifier (RID) for the desired device loaded into the EAR. The operating system should then set the enable bit in the EAR upon loading the controller's RID into the EAR. The operating system will then load the TCR in the controller with the appropriate information for a data transfer.

In a second step 510, the processor will receive and decode an instruction of the process to determine whether the instruction is a data transfer instruction. If so, then the data transfer instruction is executed as described herein. In step 520, the processor will check the EAR to determine whether the enabled bit is on for the intended device. If not, then in step 525, a program interrupt is generated. In step 530, the processor will perform an effective address to virtual address translation. This yields the page table entry index whereby the processor accesses all the relevant control information about the page in question from the page table. In step 540, the processor will check page protection for the page using the page protection bits from the page table entry (typically, this page table entry will be present in the TLB cache). In step 550, the appropriate reference and/or change bits are set to maintain data coherency between the common main memory and any disk storage. If this is a data transfer in (LOAD) command, then the processor will set the reference bit in the page table entry if the bit is not already set. If this is a data transfer data out (STORE) command, then both the reference bit and the change bit are set if they are not already set in the page table entry. In step 560, the processor will place the real address of the data to be transferred onto the bus along with the RID (which identifies the transfer device or controller) from the EAR and the transfer type (which indicates whether the transfer is a transfer in (LOAD) or transfer out (STORE) command). At this point, the device has the necessary information to conduct the requested data transfer and the indicated operation on the data. Optionally, the process may query the device to determine whether the requested transfer has been accepted, completed without exception, or other status. In the event that a process is trying to page out virtual memory, a methodology must be adhered to between the processors and devices to ensure data integrity. A preferred methodology will be described herein with reference to FIGS. 8C and 8D.

Figure 8B:
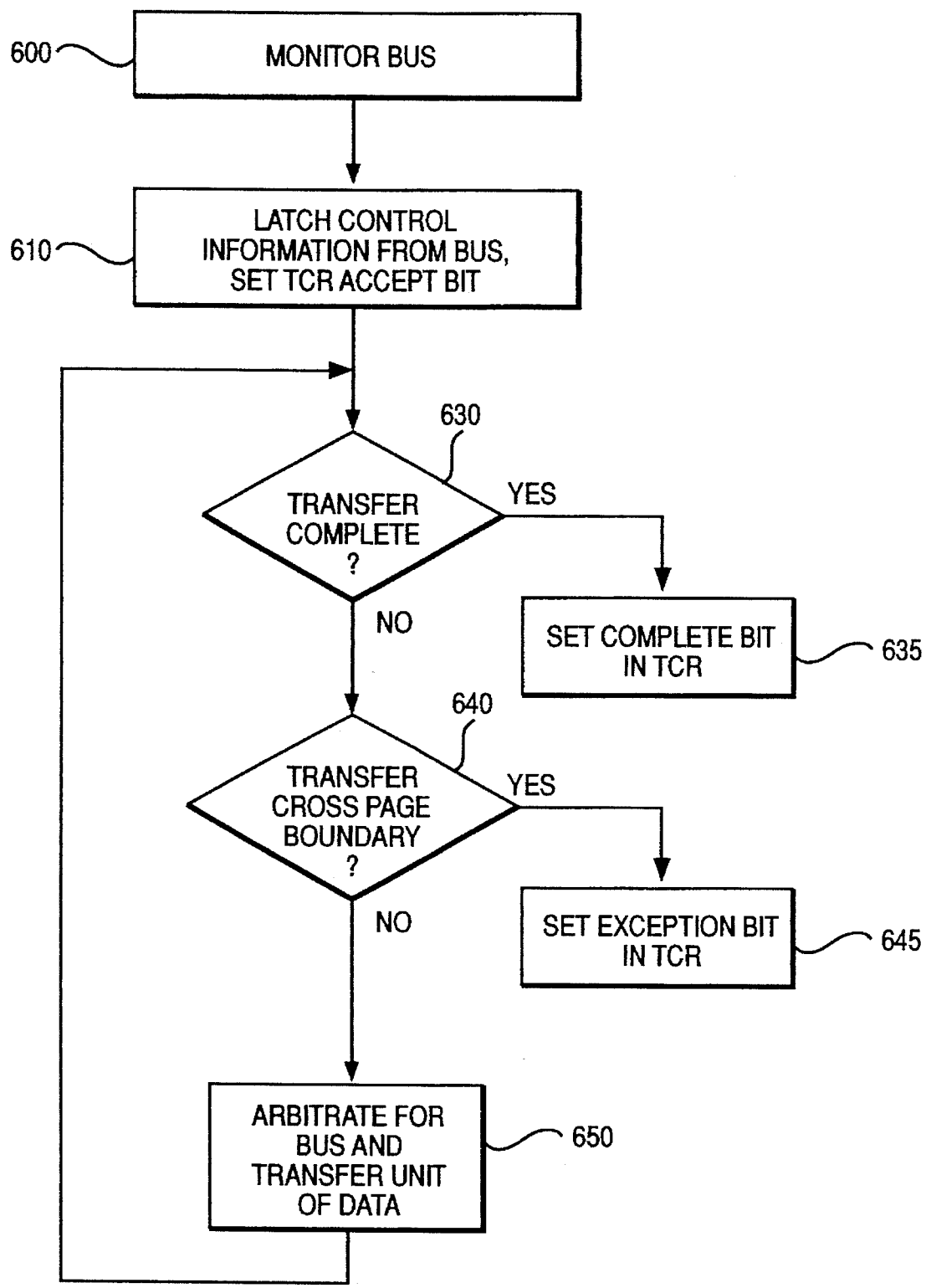

FIG. 8B is a flowchart illustrating how a device executes the data transfer command received from a processor on the system bus as described above with reference to FIG. 8A. In step 600, the device continuously monitors the bus for a transfer data transaction type on the system bus concurrent with a RID which is mapped to the device. Once received, in step 610, the device latches the real address from the bus and sets the command accepted bit in column 13 of the TCR. If the transfer data command is a transfer data out (STORE), then the TCR latches the data from the data bus (which originated from the source GPR (RS) of the initiating processor). If the transfer data command is a transfer data in (LOAD) command, then the contents of the TCR are placed onto the bus (this is to be latched into the target GPR (RT) of the initiating processor). In step 630, the device determines whether the data transfer is complete. If yes, then the device sets the complete bit in the TCR and discontinues operation. If not, then in step 640, the device determines whether the unit of data to be transferred crosses a page boundary. If yes, then in step 645, the device will set exception bit in the TCR and then discontinue operation. The data transfer operation will have to be restarted later by the processor initially requesting the data transfer. If the transfer does not cross a page boundary, then in step 650 the device arbitrates for the bus and then transfers a unit of data across the bus between the device and common main memory (from the common main memory to the device for a data transfer in (LOAD) command or from the device to the common main memory for a data transfer out (STORE) command). Processing then returns to step 630.

Figure 8C:
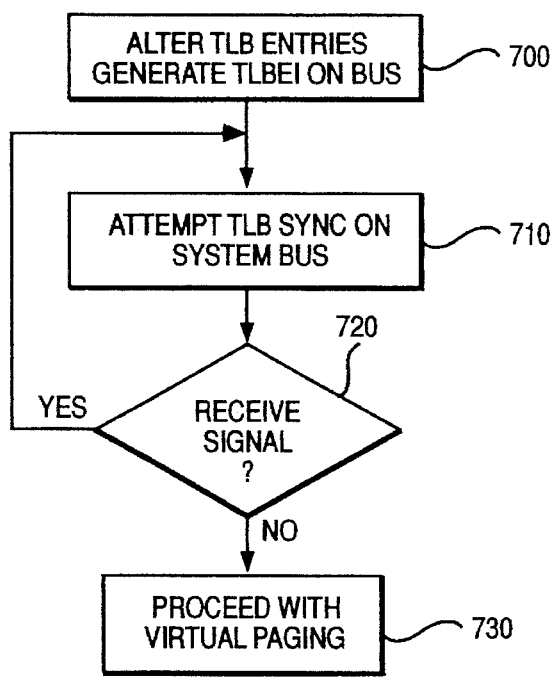

FIG. 8C is a flowchart illustrating a processor attempting to synchronize all the TLBs prior to virtual paging by the processor of the data pointed to by the TLBs. In step 700, when a virtual page is to be removed and the underlying real page reassigned to another virtual address or program, the page table entry containing the translation for the page to be reassigned is altered, making the translation invalid. Any copy of the altered entry in the processor's TLB is then invalidated. The processor then puts a TLB entry invalidate (TLBEI) on the system bus, including bits 12–19 of the effective address of the data being remapped by the virtual paging. The effective address bits are used by the device to determine whether the processor may alter or remap the data being transferred by the device. In step 710, the processor then attempts to synchronize all the TLBs to maintain coherency by putting a TLB sync command on the system bus. In step 720, the processor waits for a period of time to determine whether it receives a retry signal from any device regarding synchronizing the TLBs. As described below with reference to FIG. 8D, the device may cause the TLB sync from the process to be retried if it could possibly alter or remap the data being transferred by the device. If the processor receives a retry signal on the system bus, then the processor will wait a period of time and will repeat step 710 to again attempt to synchronize the TLBs. If the processor does not receive a retry signal, then in step 730, the processor proceeds with virtual paging.

Figure 8D:
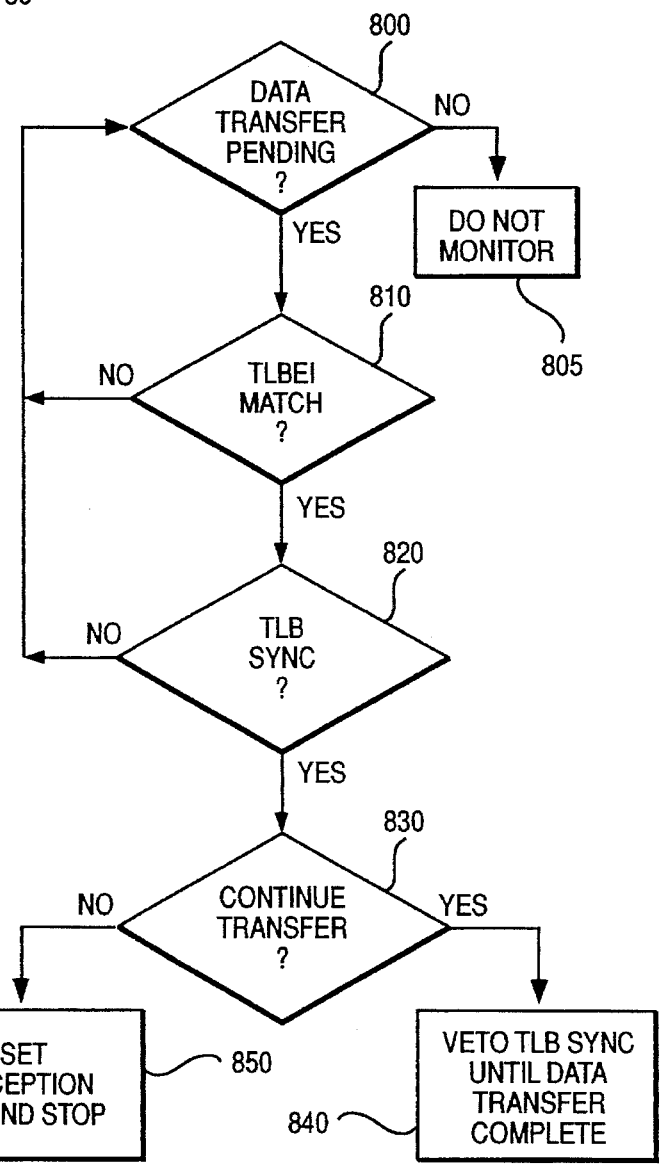

FIG. 8D is a flowchart illustrating a device determining whether to retry a TLB sync operation requested by a processor. In step 800, the device determines whether a data transfer is in progress for the device. If no, then in step 805, the processor does not monitor the system bus for modifications to the common main memory. In step 810, the device observes a TLB entry invalidation (TLBEI) on the system bus which includes a portion of the effective address of the data to be reallocated by paging out by the processor. If the portion of the effective address does not match the portion of the effective address stored in the TCR, then processing returns to step 800. If yes, then in step 20, the device waits to receive a TLB sync. If not received, then processing continues to step 800. If the TLB sync command is received, then in step 830, the device determines whether to cause the TLB sync to be retried with a retry signal sent to the processor sending the TLB sync. In the preferred embodiment, the device determines whether to cause the TLB sync to be retried by determining whether the data transfer can be completed within an acceptable period of time with regards to system bus interrupt latency. The device does this by determining whether the remaining portion of the data to be transferred can be stored in the open device physical data buffers. If the data transfer can be completed without an overflow of the buffers, then in step 840 the device will prevent any attempt by the processors to synchronize the TLBs with a retry signal on the system bus. The retry signal is needed because TLB synchronization could allow a process to alter the memory location previously specified to the device in the transfer data command, because the operating system is free to perform virtual paging once the TLBs are synchronized. The device will persist in causing the processor's TLB sync commands be retried until the initiated transfer of data and associated operation is completed. If the data transfer cannot be completed without an overflow of the device buffers, then in step 840 the device will set an exception bit in the TCR and discontinue operation. At some later time, the program which initiated the data transfer will reinitiate the data transfer.

In alternative embodiments, the device may predetermine whether the data transfer can be completed without overflowing the device buffers and then automatically provide a retry signal or not for any relevant TLB sync commands. In addition, the device may provide a retry signal for any TLB sync command without checking to see whether the TLB sync may affect the data being transferred by the device. Furthermore, the device may use a counter to automatically cause a TLB sync to be retried a specific number of time before posting an exception. The counter indicates the number of retries remaining that may be used by the device to prevent a processor from modifying the page table in common main memory prior to the completion of a data transfer. In addition, the device may also veto a requested TLB sync until some later time as a delay. The present invention may also be utilized with processors that do not utilize a TLB sync or TLBEI commands. In that case, the TLB invalidation and synchronization functions are performed using software and interprocessor communication. However, the controllers would need to be polled by reading their status to ensure that any pending data transfers have been completed or are terminated.

In conclusion, the present invention avoids the overhead and degraded performance that results from the requirement that a page must be pinned for a data transfer operation. In addition, the present invention helps minimize the number of pages that are pinned which is desirable in virtual memory systems.

Although the present invention has been fully described above with reference to specific embodiments, other alternative embodiments will be apparent to those of ordinary skill in the art. For example, the present invention may also be utilized in a 64-bit environment. Therefore, the above description should not be taken as limiting the scope of the present invention which is defined by the appended claims.

What is claimed is:

1. A method for managing a data transfer between a first device and an allocated portion of common memory, wherein said first device and said common memory are coupled by a data bus, said method comprising the steps of:

receiving a reallocation request of the allocated portion of common memory from a second device;

in response to receipt of said reallocation request by said first device, determining if said data transfer can be completed without data bus latency exceeding a predetermined amount of time;

in response to determining that said data transfer can be completed without data bus latency exceeding said predetermined amount of time, transmitting a veto of the requested reallocation to the second device; and delaying the reallocation request;

in response to determining that said data transfer cannot be completed without data bus latency exceeding a predetermined amount of time, granting said reallocation request;

wherein the step of transmitting a veto includes transmitting a retry signal a predetermined number of times in response to receiving a reallocation request a predetermined number of times; and in response to receiving said reallocation request more than said predetermined number of times, discontinuing the managed data transfer prior to completion.

2. The method of claim 1 further comprising a step of determining whether the requested reallocation would affect the managed data transfer.

3. The method of claim 2 further comprising the step of storing information necessary for restarting the managed data transfer prior to discontinuing the managed data transfer.

4. The method for managing a data transfer of claim 1, wherein said step of determining if said data transfer can be completed without data bus latency exceeding a predetermined amount of time comprises:

determining if a remaining portion of data to be transferred can be stored within data buffers within said first device.

5. The method for managing a data transfer of claim 1, wherein said first device is a peripheral device and said second device is a processor, said method further comprising:

obtaining permission from an operating system to communicate with said peripheral device; and thereafter, instructing said peripheral device to transfer data with said allocated portion of said common memory.

6. An apparatus for transferring data between a peripheral device and a common memory in a virtual memory system, wherein said peripheral device and said common memory are coupled by a data bus, comprising:

means for instructing the peripheral device to transfer data with an allocated portion of the common memory;

means for requesting a reallocation of the allocated portion of the common memory;

means for determining if said data transfer can be completed without data bus latency exceeding a predetermined amount of time;

means for transmitting a veto of the requested reallocation from the peripheral device in response to determining that said data transfer can be completed without data bus latency exceeding said predetermined amount of time;

wherein the means for transmitting a veto includes means for transmitting a retry signal a predetermined number of times in response to receiving a reallocation request a predetermined number of times; and means for discontinuing the data transfer prior to completion in response to receiving said reallocation request more than said predetermined number of times.

7. The apparatus of claim 6 further comprising means for determining whether the requested reallocation would affect the instructed data transfer.

8. The apparatus of claim 7 further comprising means for storing information necessary for restarting the requested data transfer prior to discontinuing the requested data transfer.

9. The apparatus of claim 7 further comprising means for obtaining permission from an operating system to communicate with the peripheral device prior to instructing the peripheral device to transfer data.

10. The apparatus for transferring data of claim 6, wherein said means for determining if said data transfer can be completed without data bus latency exceeding a predetermined amount of time comprises:

means for determining if a remaining portion of data to be transferred can be stored within data buffers within said peripheral device.

11. A data processing system for transferring data in a virtual memory system comprising:

a) at least one processor;

b) a peripheral device coupled to the processor across a system bus;

c) a common memory coupled to the at least one processor and the peripheral device across a system bus;

d) means for instructing the peripheral device to transfer data with an allocated portion of the common memory;

e) means for requesting a reallocation of the allocated portion of the common memory;

f) means for determining if said data transfer can be completed without system bus latency exceeding a predetermined amount of time;

g) means for transmitting a veto of the requested reallocation from the peripheral device to said at least one processor in response to determining that said data transfer can be completed without system bus latency exceeding a predetermined amount of time;

wherein the means for transmitting a veto includes transmitting a retry signal a predetermined number of times in response to receiving a reallocation request said predetermined number of times; and means for discontinuing the data transfer prior to completion in response to receiving said reallocation request more than said predetermined number of times.

12. The data processing system of claim 11 further comprising means for determining whether the requested reallocation would affect the instructed data transfer.

13. The data processing system of claim 12 further comprising means for storing information necessary for restarting the requested data transfer prior to discontinuing the requested data transfer.

14. The data processing system of claim 12 further comprising means for obtaining permission from an operating system to communicate with the peripheral device prior to instructing the peripheral device to transfer data.

15. The data processing system for transferring data of claim 11, wherein said means for determining if said data transfer can be completed without system bus latency exceeding a predetermined amount of time comprises:

means for determining if a remaining portion of data to be transferred can be stored within data buffers within said peripheral device.

* * * * *